2,999,019
       MEAT TENDERIZING COMPOSITION AND
                METHOD OF USING
Ervin W. Hopkins, Hinsdale, and Leonard J. Zimont,
  Addison, Ill., assignors, by mesne assignments, to Ar-
  mour and Company, Chicago, Ill., a corporation of
  Delaware
       No Drawing. Filed Mar. 4, 1957, Ser. No. 643,515
                  12 Claims. (Cl. 99—107)

This invention relates to a meat tenderizing composition and the method of using the same in the treatment of meat, and more particularly, to such a composition and the use thereof as applied to beef.

Within recent years, meat tenderizers have come into greater use. Significant advantages are achieved from the use of such compositions. The usual steaks, chops, etc. may be made more tender, easier to chew and generally more satisfactory to the eater. There is also an economic advantage in that the naturally less tender cuts of meat and meat from lower grade of carcass may, by treatment with tenderizing compositions, be made suitable for use as steaks or for use in ways which ordinarily require higher priced pieces of meat. This latter advantage is of benefit not only to the particular user but also to the country as a whole, since by this practice the supply of meat is more efficiently used.

Two methods of testing the efficacy of a tenderizer are currently employed. One method is especially dependable in the qualitative sense and involves a panel of taste experts. The other method is more reliable in a quantitative sense and involves the use of a shear machine. We believe the most satisfactory method of evaluating the efficacy of a tenderizer is to combine both methods. We have found that both of the foregoing methods provide results indicative of a high degree of tenderizing efficacy when the composition of our invention is employed.

The tenderizing compositions heretofore available have been found to be inadequate in providing the desired tenderness in many cuts of meat. Furthermore, the tenderizing compositions heretofore available produce undesirable shrinkage of the meat. Both of these drawbacks are overcome through the use of the composition of our invention. When meat is tenderized according to our invention, not only is the meat significantly tenderized over that achievable through the use of previously available preparations, but the shrinkage of the meat is surprisingly limited.

An object of our invention is to provide a superior tenderizing composition useful in the treatment of meat. Another object is to provide a tenderizing composition especially suited for tenderizing beef. Yet another object is to provide a method for tenderizing meat wherein shrinkage is materially less than that brought about through the use of previously available tenderizing compositions. Other objects and advantages of our invention can be seen as this specification proceeds.

In one embodiment of the invention, a pyrophosphate salt and sodium chloride are combined with meat to bring about a striking increase in meat tenderness. The sodium chloride and pyrophosphate salt can be applied as a coating or can be injected into the meat. When a coating is to be applied, the meat may be dipped into a solution of sodium chloride and the pyrophosphate salt. Usually a brief period of dipping, such as for example, 1 minute, is found to be sufficient to bring about the effective, increase in tenderness, while at the same time materially restricting the shrinkage.

Any pyrophosphate salt having a nontoxic cation may be employed. Excellent results have been obtained with sodium pyrophosphate. The use of a pyrophosphate salt in our invention has been found to produce a striking increase in tenderness over that obtained by sodium chloride alone. Since it has been our experience that the pyrophosphate salt itself is incapable of increasing tenderness, we believe that the sodium phosphate significantly potentiates the sodium chloride. Although the mechanism of our invention is imperfectly understood, we believe the pyrophosphate ion is important in potentiating the tenderizing effect of sodium chloride. For example, we have found that the presence of a pyrophosphate ion in a tenderizing composition produces results superior to those produced by increasing the sodium ion concentration.

The percentage of sodium chloride and pyrophosphate may vary through wide limits. When we employ an aqueous solution in the practice of our invention, we prefer to use quantities of sodium chloride and a phosphate salt up to an amount needed to saturate the solution. We have obtained excellent results with an aqueous solution containing about 1% by weight of sodium pyrophosphate and 10% to 22% by weight of sodium chloride. Saturated solutions of sodium pyrophosphate and sodium chloride contain amounts of about 3% and 25%, respectively, depending upon the temperatures involved.

In the carrying out of the above process, it is important to hold the treated meat products for a period of time before cooking. For example, after the meat is dipped into the solution, it is desirable that the dipped product be held for at least 2 hours, and preferably for a longer period, before cooking. During the holding period we prefer to keep the dipped products in a chilled state and preferably at a temperature between 34° and 42° F. It will be understood that such temperatures will vary depending upon the particular meat under treatment.

We have found that in the dipping of steaks, it is usual that approximately 3% of the weight of the meat be taken up in the form of the coating. However, it is to be understood that this may vary somewhat depending upon the surface condition of the meat being treated. When our tenderizing composition is injected, larger quantities can be employed. For example, we have obtained excellent results by injecting an amount of our tenderizing composition of about 10% of the weight of the meat. We prefer not to go substantially above this amount when the composition is a saturated aqueous solution. However, if a stronger "salty" taste is desired, larger amounts can be conveniently employed. We prefer to hold meat that has been injected with our tenderizing composition for a somewhat longer period than meat that has been coated with it. We have found it desirable to hold injected meat in a chilled state for from about 1 to 8 days. Excellent tenderizing is achieved by holding the injected meat for about 3 days. When we inject our tenderizing composition into a carcass, we prefer to make a plurality of injections at spaced sites.

In the treatment with pyrophosphate salt and sodium chloride, it is apparent that some cooperative effect is produced by the two treating materials, since the pyrophosphate salt alone is ineffective in increasing tenderness of the meat. While sodium chloride alone, in the process described above, has beneficial effect in increasing the tenderness of the beef, the combined action of the pyrophosphate salt and sodium chloride, for some reason which we do not now understand, produces a remarkable increase in tenderness while at the same time restricting the shrinkage which is known to accompany treatment with tenderizing compositions previously employed.

Examples of the processes may be set out as follows:

EXAMPLE I

Four groups of steaks taken from a boneless sirloin strip were involved in this test. Each steak was ¾ inches thick. One group of steaks was cooked in a conventional fashion to serve as a control. Another similar group of steaks were dipped in a commercial preparation containing papain and held 2 hours before cooking, then cooked, as were the controls. A third group of similar steaks were dipped in an aqueous solution containing 22% sodium chloride, held over night (approximately 12–24 hours), and then cooked. A fourth group of steaks were dipped in an aqueous solution containing 22% sodium chloride and 1% sodium pyrophosphate and likewise held over night before cooking. The cooked steaks were submitted to two different panels of experts for ranking as to tenderness. The average ranking of the steaks treated as above is set forth in Table I below, wherein the numeral 1 indicates the most tender condition of steak, and the numeral 4 denotes the least tender condition of steak.

*Table I*

| Group | Treatment | Panel 1 | Panel 2 |
|---|---|---|---|
| 1 | Control | 3.8 | 4.0 |
| 2 | Papain preparation | 2.2 | 2.8 |
| 3 | 22% Salt | 2.4 | 2.0 |
| 4 | 22% Salt+1% Sodium Pyrophosphate | 1.2 | 1.2 |

EXAMPLE II

The superiority of our compositions as tenderizers is further substantiated by shear test. For this test, a conventional Warner-Bratzler shear machine was employed. The results of testing steaks according to the shear method are set forth below. It may be explained that in this experiment no control was run since the number of steaks capable of being derived from the cut of beef provided were all needed for the treatments indicated.

A beef loin was semi-frozen and cylinders ⅞" in diameter were cut from it. The cylinders were divided into three groups of substantially identical make-up so as to have uniform samples for the treatment to be employed. One group of cylinders was dipped in a 10% solution of salt and held over night before cooking. A second group was dipped into a solution of 10% salt and 1% sodium pyrophosphate and also held over night before cooking. A third group was dipped into a solution of 22% salt and held over night before cooking. After cooking each of the three groups of samples, the samples were subjected to shearing tests on a Warner-Bratzler shear machine with the results shown in Table II below. Although in the experiments set forth in this specification meat was held over night, we have achieved equally favorable results by holding the meat for about 2 hours.

*Table II*

| Group | Treatment | Shear Force in Lbs. |
|---|---|---|
| 1 | 10% Salt | 23.5 |
| 2 | 10% Salt+1% Sodium Pyrophosphate | 20.7 |
| 3 | 22% Salt | 22.9 |

From the foregoing, it is to be seen that salt alone provides a significant increase in tenderness of meat. Further, the combination with salt of sodium pyrophosphate produces a marked increase in tenderness over that achieved by salt alone. As pointed out above, the mechanism by which the pyrophosphate salt enhances the tenderizing ability of the sodium chloride is felt to be one of potentiation, as can be appreciated from a consideration of Example III below.

EXAMPLE III

A beef loin was semi-frozen and two groups of cylinders each ⅞" in diameter were cut from the beef loin. One group of cylinders acted as a control and was held over night, then cooked in a conventional fashion. The other group of cylinders was dipped into a 1% aqueous solution of sodium pyrophosphate, held over night, then cooked as were the controls. Both groups of samples were sheared on a Warner-Bratzler shear machine, the shear force for the controls amounting to 20.96 while that for the sodium pyrophosphate-treated samples amounted to 20.93. The slight difference in results is considered within the limts of experimental error and this experiment demonstrates that the employment of sodium pyrophosphate alone as a tenderizing composition produces no significant increase in tenderness of meat.

EXAMPLE IV

Cylinders from beef loin were prepared according to the procedure set forth above in Example II. One group of cylinders was used as a control, another group dipped in 22% salt solution, and a third group dipped in a solution of 22% salt and 1% sodium pyrophosphate. Three groups of steak strips were also cut from the same loin and were subjected to the same treatments as the cylinders. After holding the samples over night, the samples were cooked. The cylinders were subjected to shear test and the strips to panel taste test, with the results set forth below in Table III.

*Table III*

| Group | Treatment | Shear Force in Lbs. | Average Ranking by Panel |
|---|---|---|---|
| 1 | Control | 26.2 | 2.2 |
| 2 | 22% Salt | 23.1 | 1.7 |
| 3 | 22% Salt, 1% Sodium Pyrophosphate | 19.1 | 1.0 |

In the foregoing table, the panel ranking is based on the numeral 1, representing the most tender, while the numeral 3 would indicate the least tender meat.

EXAMPLE V

Three groups of steaks taken from the same piece of beef were employed in this test. Each group included six individual steaks. One group was untreated and used as a control. A second group was dipped in an aqueous solution containing 10% sodium chloride and 1% sodium pyrophosphate. The third group was dipped into an aqueous solution containing 22% sodium chloride and 1% sodium pyrophosphate. The steaks of all three groups were stored for 18 hours at 40° F. After cooking, these steaks were sampled by a panel of six judges to determine relative tenderness. The ranking of the three groups of steaks is set forth in Table IV below. In Table IV, the numeral 1 indicates a high degree of tenderness, and the numeral 3 indicates the least tender condition of steak.

*Table IV*

| Group | Treatment | Average Ranking |
|---|---|---|
| 1 | Control | 3.0 |
| 2 | 10% Salt, 1% Sodium Pyrophosphate | 1.8 |
| 3 | 22% Salt, 1% Sodium Pyrophosphate | 1.2 |

EXAMPLE VI

To demonstrate the usefulness of our invention in limiting the shrinkage which meat undergoes after treatment with a tenderizing composition, the following procedure was followed.

7/8″ diameter cylinders were cut from a semi-frozen beef loin and were divided into three uniform groups. One group was used as a control, a second group was dipped in a 10% salt solution, while the third group was dipped into a solution containing 10% salt and 1% sodium pyrophosphate. After storage over night, the various samples were cooked and the shrinkage determined, the results appearing in Table V below.

*Table V*

| Group | Treatment | Shrinkage in percent |
|---|---|---|
| 1 | Control | 21.0 |
| 2 | 10% Salt | 16.1 |
| 3 | 10% Salt+1% Sodium Pyrophosphate | 13.2 |

From the foregoing, it is to be seen that salt materially lessens the shrinkage that occurs in meat treated with a tenderizer. In Example VI, the control was treated with a commercially available tenderizer containing papain as the essential enzyme ingredient.

In the practice of our invention on large sections of meat, it is possible to inject the tenderizing composition. The following examples illustrate this embodiment of our invention.

EXAMPLE VII

A section of boneless sirloin from the left side of a beef carcass was injected along its length in 3 rows of sites. The spacing between rows was 1½″. The injection sites were 1½″ apart in each row. The injection fluid was an aqueous solution containing 20% sodium chloride and 1% sodium pyrophosphate. The total quantity of fluid injected was about 10% of the weight of the meat before injection. The right loin was provided as a control. Both the control and the treated meat were stored at 40° F. After about 2¾ days, sections of both loins were cut off, cooked, and submitted to a panel of six judges for testing. The remaining portions of the loins were maintained under refrigeration and additional sections removed after 6 days and 8 days. These loin sections were also cooked and evaluated by the same panel as before. The results of the panel tests are set forth below in Table VI.

*Table VI*

| Treatment | Average Ranking |
|---|---|
| Control—held 2¾ days | 4.0 |
| Injected—held 2¾ days | 2.2 |
| Control—held 6 days | 4.0 |
| Injected—held 6 days | 1.5 |
| Control—held 8 days | 4.0 |
| Injected—held 8 days | 2.3 |

EXAMPLE VIII

Another experiment was performed to determine the effect of salt concentration on the degree of tenderness brought about by injection. For this, 4 different loins of about the same degree of toughness were selected. The pattern of injection described in Example VII was followed. The fluid injected into each loin was about 10% of the weight of the meat. The injection solution in each case was an aqueous solution containing sodium chloride and 1% sodium pyrophosphate. The amount of salt differed in each solution. Since it appeared that substantial tenderizing was achieved in about 3 days in Example VII, the holding period here was set at 3 days. The salt concentrations in the solutions injected into the 4 loins are set forth in Table VII below, along with the panel rating of tenderness of each of the loins after cooking.

*Table VII*

| Salt concentration: | Panel ranking |
|---|---|
| 22 | 2.0 |
| 10 | 3.0 |
| 7 | 3.6 |
| 5 | 3.8 |

The foregoing detailed description has been given for clearness of understanding only, and no unnecessary limitations are to be inferred therefrom.

We claim:

1. A method of tenderizing meat which comprises coating the meat with from about 3 to about 10 percent of the weight of said meat with an aqueous solution of sodium chloride and a pyrophosphate salt, said solution containing at least about 1 percent by weight pyrophosphate and at least about 10 percent by weight sodium chloride.

2. A method of the character set forth in claim 1 wherein the said solution contains about 1 percent sodium pyrophosphate.

3. A method of tenderizing meat which comprises coating the meat with about 3 percent by weight of said meat of an aqueous solution of sodium chloride and a pyrophosphate salt, said solution containing at least about 1 percent by weight pyrophosphate and at least about 10 percent by weight sodium chloride, and holding the coated meat for from about 2 to 24 hours before cooking.

4. A method of tenderizing beef, comprising coating the beef with about 3 percent by weight of said beef of an aqueous solution of sodium chloride and a pyrophosphate salt, said sodium chloride being present in the amount of about 10 to 22 percent by weight of the solution, said pyrophosphate being present in an amount of about 1 percent by weight of the solution, and holding the beef thus coated for from about 2 to 24 hours before cooking, whereby the beef is substantially tenderized without undue shrinkage.

5. A method of tenderizing meat, comprising injecting the meat at a plurality of spaced sites with about 10 percent by weight of said meat of an aqueous solution of sodium chloride and a pyrophosphate salt, said solution containing at least about 1 percent by weight pyrophosphate and at least about 10 percent by weight sodium chloride.

6. A method of tenderizing meat, comprising injecting the meat at a plurality of spaced sites with an aqueous solution of sodium chloride and a pyrophosphate salt, said solution containing at least about 1 percent by weight pyrophosphate and at least about 10 percent by weight sodium chloride, and holding the meat thus injected for up to about eight days.

7. In a process for tenderizing meat, the step of combining said meat with an aqueous solution of sodium chloride and a pyro-phosphate salt, said aqueous solution weighing from about 3 to about 10 percent of the weight of the said meat, said aqueous solution containing at least about 1 percent by weight pyro-phosphate salt and at least about 10 percent by weight sodium chloride.

8. The product made by the process of claim 7.

9. The product made by the process of claim 3.

10. A composition for improving the tenderness of meat comprising an aqueous solution of at least about 10 percent by weight sodium chloride and at least about 1 percent by weight of a pyrophosphate salt.

11. The composition of claim 10 containing about 1 percent sodium pyrophosphate.

12. A composition of the character set forth in claim 11 wherein the said solution contains about 10 to 22 percent sodium chloride.

References Cited in the file of this patent
UNITED STATES PATENTS 2,513,094    Hall _____ June 27, 1950

(Other references on following page)

UNITED STATES PATENTS

| | | |
|---|---|---|
| 2,688,555 | Komarik et al. | Sept. 7, 1954 |
| 2,812,261 | Wasserman | Nov. 5, 1957 |
| 2,852,392 | Huber et al. | Sept. 16, 1958 |

FOREIGN PATENTS

| | | |
|---|---|---|
| 696,617 | Great Britain | Sept. 2, 1953 |

OTHER REFERENCES

"Chemicals and the Meat Industry," Circular No. 14, June 1955, by H. R. Kraybill, published by American Meat Institute Foundation, 939 E. 57th St., Chicago 37, Ill., pages 5 and 6.

"Food Engineering," October 1955, pages 84, 85, and 86, article entitled "How Phosphates Can Benefit Meats," by R. E. Morse.

"Food Technology," 1956, vol. X, No. 11, pages 546 to 552, inclusive, article entitled "The Action of Phosphates in Sausage Products," by C. E. Swift et al.